Jan. 9, 1940.  L. A. CABRERA  2,186,665
ADVERTISING DEVICE
Filed July 1, 1938

LUIS A. CABRERA
INVENTOR

BY Victor J. Evans & Co.
ATTORNEYS

Patented Jan. 9, 1940

2,186,665

UNITED STATES PATENT OFFICE 2,186,665

ADVERTISING DEVICE

Luis A. Cabrera, Caracas, Venezuela, assignor of one-fourth to Edmund T. Stewart, New York, N. Y.

Application July 1, 1938, Serial No. 217,075

1 Claim. (Cl. 40—138)

This invention relates generally to advertising devices and more particularly to a new and improved advertising device including a composite display having static and dynamic elements relatively movable for alteration of the display.

It is among the more important objects of the present invention to provide a new and improved advertising device including a composite display having relatively stationary or static elements cooperating with relatively movable or dynamic elements whereby variation in visual effect in display can be produced.

Another object of the present invention is to provide a visual display means of the type hereinbefore referred to including means for moving dynamic elements relative to static elements whereby alterations in visual effect of the display can be produced through means controlled and actuable by gravity and/or momentum.

Another object of the present invention is to provide a composite display including relatively stationary and relatively movable elements, the relatively movable elements being both rotatable and movable in a direction lateral relative to the axis of rotation thereof whereby visual effects simulating motion of objects can be produced.

A still further object of the present invention is to provide an advertising device including a visual display member having a perforate stationary element and a pivoted movable element observable through said openings in the stationary element, said movable element being actuable by means including gravity and/or momentum.

One of the important advantages of the novel dynamic visual display device according to the present invention is that it is adapted for use on bill-boards and posters for passage of vehicles whereby the display is actuated by starting and stopping or other motion of the vehicle resulting in change in force of gravity and/or momentum.

An important feature of the improved visual display device according to the present invention is the simplicity of the elements thereof and of the assembled device, whereby economies from the standpoint of manufacture are facilitated and longevity of useful life of the product is at least largely promoted.

Other objects, advantages and features of the device according to the present invention will be apparent to those skilled in the art during the course of the following description.

Regarded in certain of its broader aspects, the novel advertising device according to the present invention, comprises a composite display panel including relatively static elements having openings formed therein cooperating with relatively dynamic elements observable through said openings, motion of said dynamic elements relative to said static elements producing a predetermined and distinct alteration in a visual effect of said display channel, and means actuable by gravity and/or momentum for causing motion of said dynamic elements relative to said static elements.

In order to facilitate a fuller and more complete understanding of the present invention, a specific embodiment thereof will be hereinafter described, it being clearly understood, however, that the illustrated embodiment is given solely by way of example and is non-limitative upon the scope of the present invention, except as expressed in the subjoined claim.

Referring then to the drawing.

Figure 1:
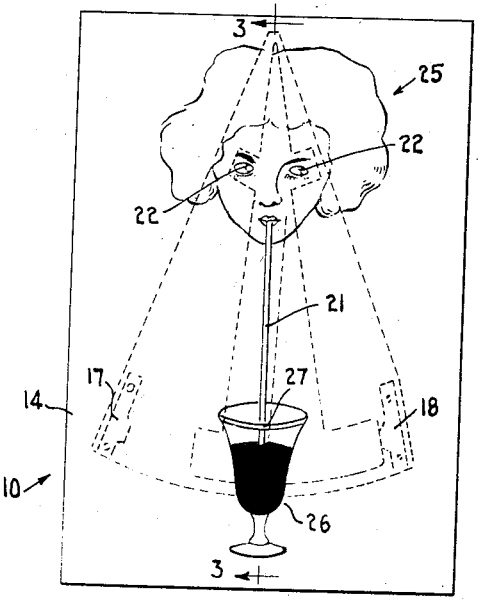
Figures 1 and 2 are substantially front elevational views of one embodiment of the advertising device according to the instant invention showing parts thereof in different positions as during use.

Referring now particularly to Figures 1 to 4 inclusive, it will be noted that the advertising device generally designated by the numeral 10, comprises a back or base member 12, intermediate cut-away members 13 and a front member 14. The layers 12, 13 and 14 are substantially fixedly united to each other to form a composite sheet having a pocket between the top and bottom layers defined by the cut-away parts of the intermediate layers 13.

A relatively movable arm 15 pivotally mounted on the support 16 mounted in parts of the intermediate layers 13, is adapted to swing within the pocket defined by the exterior and intermediate layers of the device generally designated by the numeral 10, the motion thereof being determined and limited by means including stops 17 and 18 mounted upon the base member 12 adapted to strike against end portions 19 and 20 of the pivoted member 15 during motion thereof.

Openings 21 and 22 are provided in the front portion 14 of the device and are arranged in predetermined relationship to a design generally designated by the numeral 25 provided on the exposed front face. It will be noted that in the illustrated embodiment of the invention, the design comprises a front elevational view of a female head and that the openings 21 and 22 represent respectively, a straw or glass tube and the eyes of the figure. The opening 21 extends from the mouth of the figure to a glass of soda or similar drink generally designated by the numeral 26, it being noted that the opening is discontinuous, that is to say, is broken by the rim 27 of the soda glass substantially as shown in the figures.

Figure 2:
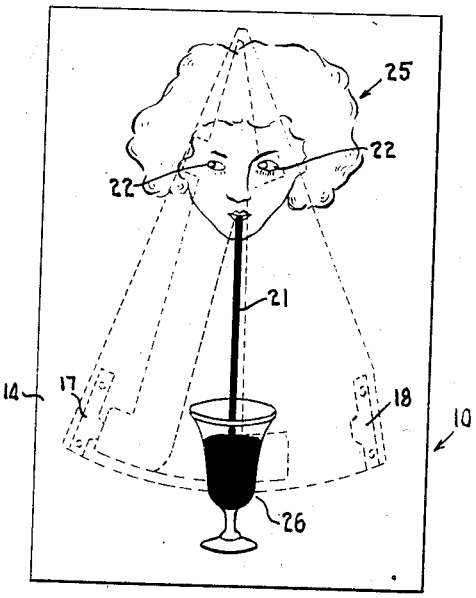
Figure 3:
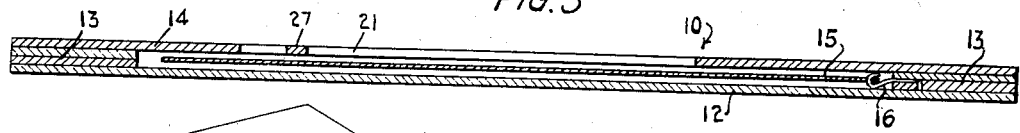
Figure 3 is substantially a vertical sectional view of Figure 1, taken along the line 3—3.
Figure 4:
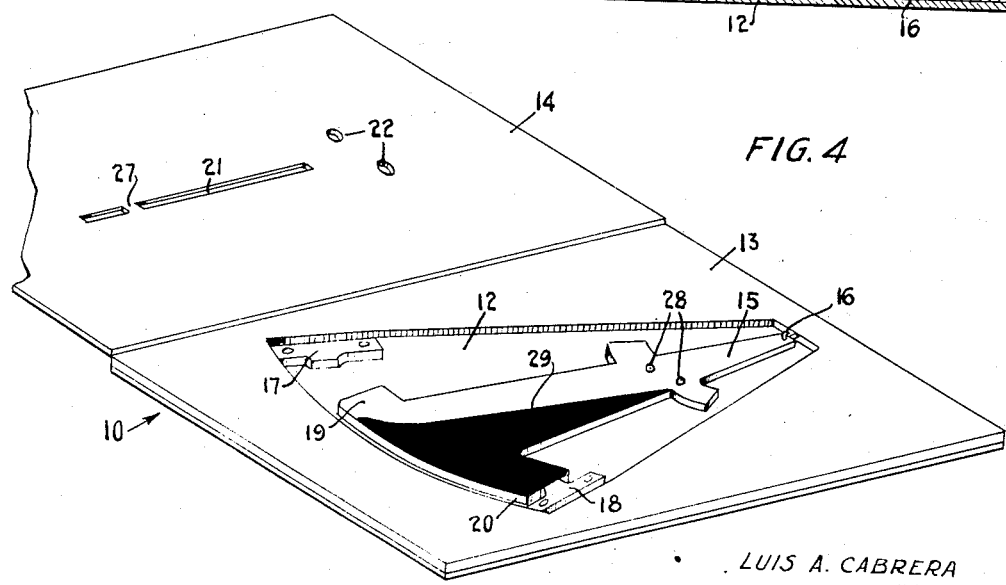
Figure 4 is essentially a perspective view of the device illustrated in Figures 1 and 2 with the front portion thereof folded back to exhibit internal parts.

It is to be noted now referring particularly to Figures 1, 2 and 4, that the pivoted arm 15 is provided with localized visually distinct areas 28 and 29 which are positionable behind but observable through the openings 21 and 22 hereinbefore referred to, whereby through movement of the pivoted arm 15, different parts of said visually distinct areas can be moved behind the openings or at least the relative position of the visually distinct areas 28 and 29 relative to the openings 21 and 22 can be substantially altered. For instance, when the portion 19 of the arm 15 is adjacent the stop 17, it will be noted that the visual effect produced upon an observer reviewing the device from the front would be that the straw simulated by the opening 22 is filled with liquid from the soda glass 26 and that the eyes of the head are in substantially the position shown in Figure 2. When, however the portion 20 of the arm 15 is adjacent the stop 18, that is to say, the arm 15 has been moved to its other limit of motion, the straw simulated by the opening 21 will appear to be devoid of fluid content and the eyes of the finger will be substantially as shown in Figure 1. It is to be understood that in use, the display device is mounted, whereby forces including gravity and/or momentum acting on the pivoted arm 15, causes reciprocation of same into position against the stops 17 and 18 successively, whereby the visual effect of the device upon different occasions, assumes the appearance shown in Figures 1 and 2 intermittently.

It will be evident then that in accordance with the present invention, means are provided for presenting dynamic advertising displays in vehicles which are alterable during motion of the vehicle by action of forces including gravity and/or momentum upon elements of the advertising display.

It is to be understood that this improvement is capable of extended application and is not confined to the exact showing of the drawing nor to the precise construction described and, therefore, such changes and modifications may be made therein as do not affect the spirit of the invention nor exceed the scope thereof as expressed in the appended claim.

What is claimed as new, is:

An advertising display including a composite board having a visual display on the exposed top surface thereof, said board comprising united top, intermediate and bottom layers, the intermediate layers having cut-away formations which with the top and bottom layers define a pocket; a dependent essentially freely laterally reciprocable member pivotally mounted within said pocket, sensitive to forces, including gravity and momentum; said top having a window formed therein for, upon occasion, exhibiting parts of said members; and display elements on said member, cooperating with said visual display on the exposed top surface of said board, the said display elements including a visually distinct irregular outline, which when viewed through said window, creates the illusion of motion in a direction different from the direction of motion of said member.

LUIS A. CABRERA.